United States Patent
Matsumoto et al.

(10) Patent No.: US 9,166,239 B2
(45) Date of Patent: Oct. 20, 2015

(54) FUEL CELL DEVICE

(75) Inventors: Yuji Matsumoto, Saitama (JP); Takuya Shirasaka, Saitama (JP); Koichiro Miyata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 834 days.

(21) Appl. No.: 13/006,150

(22) Filed: Jan. 13, 2011

(65) Prior Publication Data

US 2011/0171548 A1    Jul. 14, 2011

(30) Foreign Application Priority Data

Jan. 14, 2010  (JP) .................................. 2010-005931
Dec. 10, 2010  (JP) .................................. 2010-276306

(51) Int. Cl.
*H01M 8/04*        (2006.01)

(52) U.S. Cl.
CPC ........ *H01M 8/0491* (2013.01); *H01M 8/04231* (2013.01); *Y02E 60/50* (2013.01)

(58) Field of Classification Search
None
See application file for complete search history.

(56) References Cited

U.S. PATENT DOCUMENTS

| 5,798,186 A | 8/1998 | Fletcher et al. | |
| 2003/0129462 A1 | 7/2003 | Yang et al. | |
| 2004/0229088 A1* | 11/2004 | Hayashi et al. | 429/13 |
| 2005/0053810 A1* | 3/2005 | Kato et al. | 429/13 |
| 2008/0152972 A1 | 6/2008 | Igarashi et al. | |
| 2009/0104489 A1 | 4/2009 | Shin et al. | |
| 2009/0176135 A1 | 7/2009 | Saito et al. | |

FOREIGN PATENT DOCUMENTS

| EP | 1513209 A2 | 3/2005 |
| JP | 4-4761 | 1/1992 |
| JP | 7-211338 | 8/1995 |
| JP | 2006-100093 | 4/2006 |
| JP | 2009-64681 | 3/2009 |
| WO | 2006/117969 A1 | 11/2006 |

OTHER PUBLICATIONS

European Search Report for Application No. 11150971.7, dated Apr. 19, 2011.
European Office Action for Application No. 11150971.7, dated Jan. 5, 2012.

* cited by examiner

*Primary Examiner* — Maria J Laios
(74) *Attorney, Agent, or Firm* — Nelson Mullins Riley & Scarborough LLP; Anthony A. Laurentano

(57) ABSTRACT

A fuel cell device is equipped with an ECU 60 which executes a start-up control of a fuel cell stack 20, and executes a normal electric distribution control, after completion of the start-up control, for controlling a supply flow rate of a fuel gas to an anode electrode and a supply flow rate of an oxidant gas to a cathode electrode, so that a predetermined target current is supplied from the fuel cell stack 20 to an electric load 31. The ECU 60 makes a current adjustment element 30 to be in a state where a current larger than a minimum current necessary for the fuel cell stack 20 in the normal electric distribution control is supplied from the fuel cell stack 20 to the electric load 31, in the start-up control, during the period from starting of the supply of hydrogen to the anode electrode 22 until a gas channel of the anode electrode 22 is filled with hydrogen.

3 Claims, 3 Drawing Sheets

FUEL CELL DEVICE

TECHNICAL FIELD

The present invention relates to a fuel cell device which carries out a process for suppressing deterioration of the fuel cell during start-up.

BACKGROUND ART

Recently, a fuel cell using hydrogen and oxygen is attracting attention as a power source. During start-up of the fuel cell, supply of hydrogen to an anode channel is started, and air inside the anode channel is substituted with hydrogen. During this process of the air inside the anode channel being substituted with hydrogen, an oxidation-reduction reaction is carried out at a region A at the inlet side of the anode channel which is filled with hydrogen and at a region B at the outlet side thereof which is filled with air.

With this oxidation-reduction reaction, electromotive force is generated at the region A and the region B, platinum in a catalyst layer of the cathode exhibits high potential by the potential difference between the region A and region B, which encourages elution of the platinum, so that electrolyte membrane becomes deteriorated.

Therefore, there is proposed a technique of suppressing deterioration of the electrolyte membrane by reprecipitating platinum flowing out from the catalyst layer of the cathode, by maintaining potential of the cathode at 0.6V or less for a predetermine time or more, when it is determined during start-up of the fuel cell that the interior of the anode channel is filled with hydrogen (for example, refer to Japanese Patent Laid-Open 2009-64681).

SUMMARY OF THE INVENTION

Problems to be Solved by the Invention

In the technique disclosed in the above-identified patent document, filling of hydrogen inside the anode channel during start-up of the fuel cell is determined by whether or not a cell voltage of the fuel cell exceeded 0.9V. Therefore, there is a fear that deterioration of the electrolyte membrane had already begun when the cell voltage raised to the vicinity of 0.9V. Further, there is a fear that an output current of the fuel cell become unstable, in the case where the potential of the cathode is maintained at 0.6V or less after the anode channel is filled with hydrogen.

The present invention had been made in view of the above-mentioned background, and aims to provide a fuel cell device capable of restricting the deterioration of electrolyte membrane from occurring during start-up of the fuel cell, and the output current of the fuel cell from becoming unstable.

Means for Solving the Problems

To fulfill the object, the present invention provides a fuel cell device, comprising: a fuel cell stack configured from a plurality of membrane electrode assemblies, each of which is formed by arranging an anode electrode and a cathode electrode having a gas channel with an electrolyte membrane sandwiched in-between; a fuel gas adjustment unit which adjusts a supply flow rate of a fuel gas to the anode electrode; an oxidant gas adjustment unit which adjusts a supply flow rate of an oxidant gas to the cathode electrode; a current adjustment unit which adjusts a supply current from the fuel cell stack to an electric load connected to the fuel cell stack; and a control unit which carries out a start-up control of the fuel cell stack, and which executes a normal electric distribution control, after completion of the start-up control, for controlling the supply flow rate of the fuel gas to the anode electrode and the supply flow rate of the oxidant gas to the cathode electrode, so that a predetermined target current is supplied from the fuel cell stack to the electric load.

And, in the start-up control, the control unit makes the current adjustment unit supply to be in a state where a current larger than a minimum current, which is the current necessary for power generation operation by the fuel cell stack in the normal electric distribution control, is supplied from the fuel cell stack to the electric load, during the period from the start of supply of the fuel gas to the anode electrode until a gas channel of the anode electrode is filled with the fuel gas (a first aspect of the invention).

According to the first aspect of the invention, the control unit makes the fuel cell stack to be in a state in which the current larger than the minimum current supplied to the electric load during execution of the normal electric distribution control is supplied to the electric load, in the start-up control, during the time until the gas channel of the anode electrode is filled with the fuel gas. By making the fuel stack to be in a state in which the current larger than the minimum current supplied to the electric load during execution of the normal electric distribution control is supplied to the electric load, it becomes possible to prevent the cell voltage of the fuel cell stack from becoming high voltage, and to suppress deterioration of the fuel cell stack during start-up.

Further, in the first aspect of the invention, in the start-up control, the control unit terminates the process of making the current adjustment unit to be in a state where a current larger than the minimum current is supplied from the fuel cell stack to the electric load, and transits to the normal electric distribution control, when a wait time, which is determined assuming the time from the point in time the gas channel of the anode electrode is filled with the fuel gas to the point in time an anode outlet channel connecting the outlet and the inlet of the gas channel of the anode electrode is filled with the fuel gas, lapses (a second aspect of the invention).

According to the second aspect of the invention, by maintaining the state in which the current larger than the minimum current is supplied from the fuel cell stack to the electric load, until the anode outlet channel is filled with the fuel gas, it becomes possible to surely prevent the oxidation-reduction reaction of the fuel gas and the oxidant gas from occurring in the anode electrode, and to prevent deterioration of the electrolyte membrane.

Further, in the first aspect of the invention, the fuel cell device further comprises a stack temperature recognition unit which recognizes the temperature of the fuel cell stack, wherein, in the start-up control, the control unit makes the current adjustment unit to be in a state where a current larger than the minimum current necessary for the power generation operation of the fuel cell stack in the normal electric distribution control is supplied from the fuel cell stack to the electric load, only when the temperature of the fuel cell stack is higher than the freezing point (a third aspect of the invention).

In the third aspect of the invention, when starting-up the fuel cell stack in the case where the temperature of the fuel cell stack is equal to or lower than the freezing point, there is a possibility that it is difficult to exercise an inherent power generation ability of the fuel cell stack, from the water inside the fuel cell stack being frozen. In such situation, it becomes difficult to secure the power generation stability when a large current is supplied from the fuel cell stack to the electric load.

Therefore, during the start-up control, and limited to the case where the temperature of the fuel cell stack is higher than the freezing point, the control unit makes the fuel cell stack to be in a state where a current larger than the minimum current necessary for the power generation operation of the fuel cell stack during the normal electric distribution control is supplied to the electric load. By doing so, it becomes possible to secure the power generation stability during starting-up of the fuel cell stack in a below freezing point situation.

Further, in any one of the first to the third aspects of the invention, the control unit maintains the flow rate of the oxidant gas supplied to the cathode electrode to a constant flow rate, during execution of the start-up control (a fourth aspect of the invention).

According to the fourth aspect of the invention, it becomes possible to suppress the output voltage of the fuel cell stack from being unstable, by maintaining the flow rate of the oxidant gas supplied to the cathode electrode to a constant flow rate.

MODE FOR CARRYING OUT THE INVENTION

Figure 1:
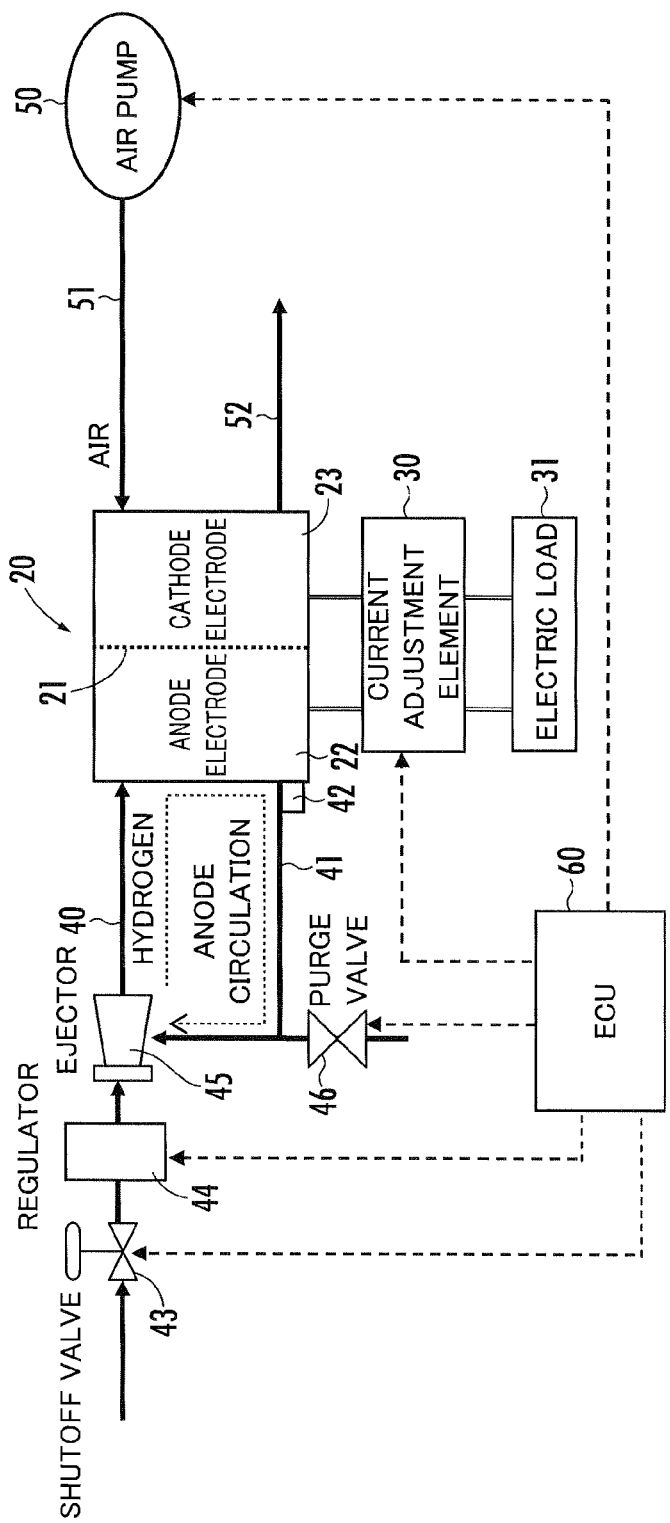
FIG. 1 is a view showing an overall configuration of a fuel cell device of the present invention.

An example of an embodiment of the present invention will be explained with reference to FIGS. 1 through 3. With reference to FIG. 1, a fuel cell device of the present embodiment is equipped with a fuel cell stack 20, an anode inlet channel 40 which supplies hydrogen as a fuel gas to the fuel cell stack 20, a cathode inlet channel 51 which supplies air as an oxidant gas to the fuel cell stack 20, a current adjustment element (a transistor, FET and the like. Corresponds to a current adjustment unit of the present invention) 30 which is connected to an anode electrode 22 and a cathode electrode 23 of the fuel cell stack 20, and which adjusts current supplied from the fuel cell stack 20 to an electric load 31, and an ECU (Electronic Control Unit, corresponds to a control unit of the present invention) 60 which carries out overall control of the fuel cell device.

The fuel cell stack 20 is provided with an electrolyte membrane-electrode assembly (a membrane electrode assembly) which sandwiches a solid polymer electrolyte membrane 21 with the anode electrode 22 and the cathode electrode 23, and the stack is configured by stacking the electrolyte membrane-electrode assembly and a separator not shown alternately. In this case, a gas channel is formed between the electrolyte membrane-electrode assembly and the separator.

The anode inlet channel 40 is connected to a hydrogen tank not shown, and is provided with a shutoff valve 43, a regulator 44, and an ejector 45. The supply flow rate of the hydrogen to the anode electrode 22 is adjusted by controlling the operation of the shutoff valve 43 and the regulator 44 with a control signal output from the ECU 60.

Further, the outlet of the anode electrode 22 and the ejector 45 is connected with an anode outlet channel 41, so that the hydrogen ejected from the anode electrode 22 without being used is supplied again from the ejector 45 to the anode electrode 22. Moreover, the anode outlet channel 41 is connected with a purge valve 46.

An anode exhaust temperature sensor 42 which detects the temperature of a gas emitted to the anode outlet channel 41 (anode exhaust gas) is provided to the anode outlet channel 41 at the vicinity of connection with the anode electrode 22. The temperature of the anode exhaust gas is approximately equal to the temperature of the fuel cell stack 20, and the two temperatures bear a proportional relationship. Therefore, the ECU 60 may recognize the temperature of the fuel cell stack 20 from the temperature detection signal of the anode exhaust temperature sensor 42.

The configuration of the ECU 60 recognizing the temperature of the fuel cell stack 20 from the detected temperature of the anode exhaust temperature sensor 42 corresponds to a stack temperature recognition unit of the present invention. Further, the stack temperature recognition unit may be configured to provide a temperature sensor inside the fuel cell stack 20 and to directly detect the temperature of the fuel cell stack 20. Moreover, the stack temperature recognition unit may be configured to estimate the temperature of a specific group of cells from the power generation status of a plurality of the cells constituting the fuel cell stack 20, and to recognize the temperature of the fuel cell stack 20 from the estimated temperature.

An air pump 50 is connected to the cathode inlet channel 51. And the flow rate of the air supplied from the cathode inlet channel 51 to the cathode electrode 23 is adjusted by controlling the number of revolutions of the air pump 50 by a control signal output from the ECU 60.

The ECU 60 is an electronic unit configured from a CPU (Central Processing Unit), a memory and the like, and the ECU 60 functions as a control unit of the present invention by making the CPU execute a control program of the fuel cell device. The ECU 60 executes a start-up control to be explained later at a start-up (beginning of power generation operation) of the fuel cell stack 20, and after completing the start-up control, transits to a normal electric distribution control of controlling the supply flow rate of hydrogen to the anode electrode 22 and the supply flow rate of air to the cathode electrode 23 so that a target current set in accordance with a required current from the electric load 31 is supplied from the fuel cell stack 20 to the electric load 31.

Next, the process of the start-up control and the normal electric distribution control of the fuel cell stack 20 by the ECU 60 will be explained with reference to the flow chart shown in FIG. 2.

When a start-up operation of the fuel cell stack 20 (in the case where the fuel cell device is mounted on a fuel cell vehicle, the operation of a starting switch by a driver, and the like) is carried out, the ECU 60 opens the shutoff valve 43 in STEP 1 and at the same time adjusts the supply pressure of hydrogen with the regulator 44, and starts start-up purge of supplying hydrogen to the anode electrode 22.

In subsequent STEP 2, the ECU 60 determines whether or not the start-up purge is completed, that is, whether or not the interior of the anode electrode 22 is filled with hydrogen. The completion of the start-up purge is determined by the lapsed time from the beginning of supply of hydrogen, the change of the cell voltage of the fuel cell stack 20 or the like. Then, the process proceeds to STEP 3 when the start-up purge is completed, and proceeds to STEP 4 after timing the lapsed time after completion of the start-up purge. On the other hand, the process does not proceed to STEP 3 when the start-up purge is not completed, and branches to STEP 4.

In STEP 4, the ECU 60 recognizes the temperature of the fuel cell stack 20 on the basis of the temperature detection signal of the anode exhaust temperature sensor 42. In subsequent STEP 5, the ECU 60 determines whether or not the temperature of the fuel cell stack 20 is higher than freezing point. The process proceeds to STEP 6 in the case where the temperature of the fuel cell stack 20 is higher than freezing point, and branches to STEP 20 in the case where the temperature of the fuel cell stack 20 is below freezing point.

In STEP 20, the ECU 60 executes a low temperature start-up process, and proceeds to STEP 9. The low temperature start-up process is a process of activating the fuel cell stack 20 while giving priority to power generation stability. Further, in STEP 6, the ECU 60 determines whether or not the lapsed time from the completion of the start-up purge is equal to or more than a predetermined time (which is set assuming the time necessary from the completion of the start-up purge to the time the interior of the anode outlet channel 41 is filled with hydrogen).

Thereafter, after the lapsed time from the completion of the start-up purge becomes equal to or more than the predetermined time, there is no fear of the occurrence of the deterioration of the electrolyte membrane 21 which is caused by an oxidation-reduction reaction carried out by the presence of the layer of hydrogen and layer of air inside the anode electrode 22. Therefore, in this case, the process branches to STEP 30, and the ECU 60 executes the normal electric distribution control of determining the supply flow rate of hydrogen and oxygen, by a power generation command which is set according to the current command value.

On the other hand, in STEP 6, when the lapsed time from the completion of the start-up purge did not reach the predetermined time, the process proceeds to STEP 7. Thereafter, the ECU 60 determines whether or not an electric distribution preparation to the electric load 31 is completed (whether or not the electric load 31 is capable of receiving electricity).

If the electric distribution preparation is not completed in STEP 7, the process branches to STEP 40, and the ECU 60 sets the current command value with respect to the current adjustment element 30 to zero (stop current supply), and sets the supply flow rate of air to the cathode electrode 23 to a predetermined air flow rate (constant flow rate).

Further, when the electric distribution preparation is completed in STEP 7, the process proceeds to STEP 8, and the ECU 60 sets the current command value with respect to the current adjustment element 30 to a predetermined current value, and sets the supply flow rate of air to the cathode electrode 23 to a predetermined air flow rate (constant flow rate).

The predetermined current value is set to a current value which is larger than the current value during idling of the fuel cell stack 20, that is, the current value supplied from the fuel cell stack 20 to the electric load 31 when the fuel cell stack 20 is in an idling state (a minimum current value necessary for power generation operation of the fuel cell stack 20, for example, a current value necessary for operating electrical accessories used for power generation operation of the fuel cell stack 20).

By supplying current larger than that during idling from the fuel cell stack 20 to the electric load 31, during execution of the start-up purge and during the completion of the start-up purge to the lapse of the predetermined time, it becomes possible to suppress the deterioration of the electrolyte membrane 21, which occurs from the cathode electrode 23 exhibiting high potential.

Figure 3:
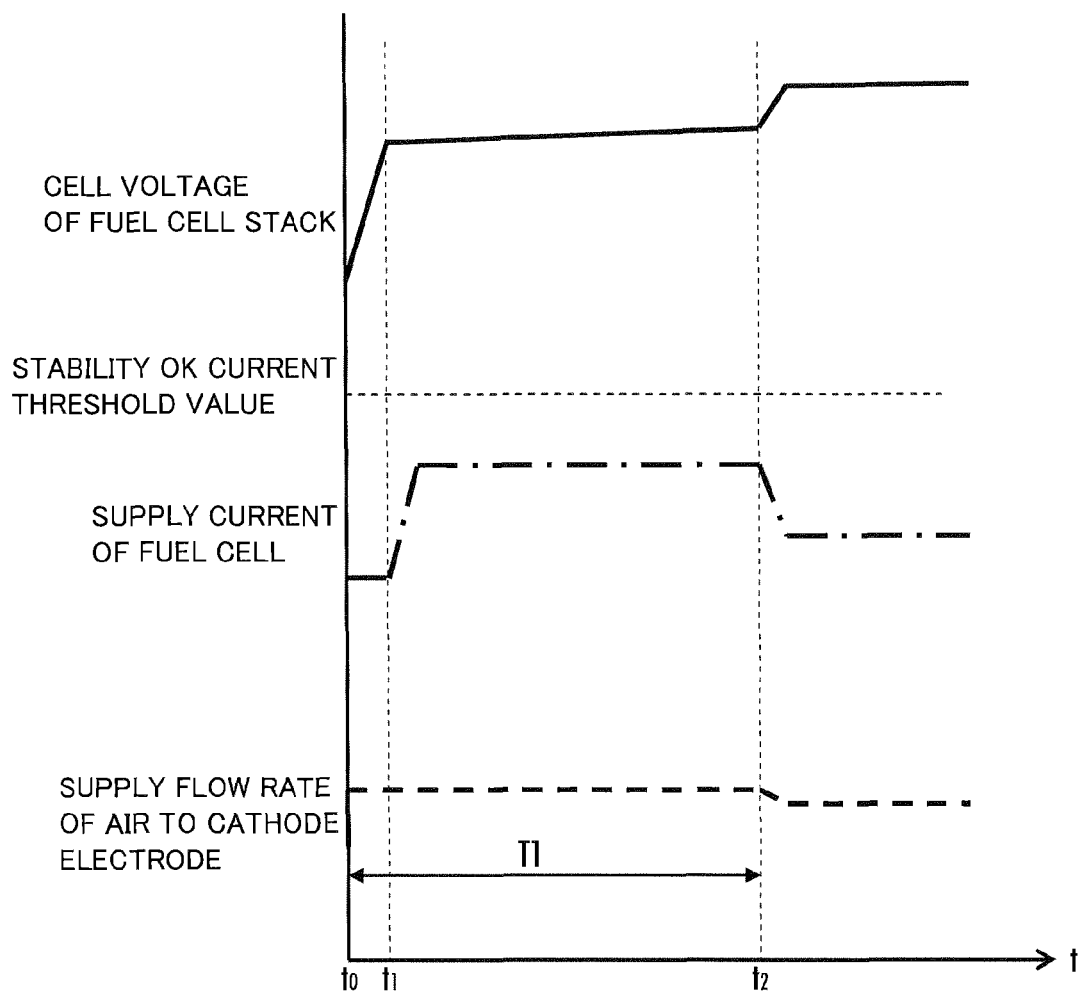
FIG. 3 is a timing chart during start-up of the fuel cell stack.

Next, FIG. 3 is a timing chart which represents the transition of the cell voltage of the fuel cell stack 20, the supply current from the fuel cell stack 20 to the electric load 31, and the supply flow rate of air to the cathode electrode 23, during execution of the start-up control, with the axis of abscissas representing time (t). In FIG. 3, $t_0$ is a point in time when the start-up command is made, $t_1$ is a point in time when the electric distribution preparation is completed and the current supply from the fuel cell stack 20 to the electric load 31 is started, and $t_2$ is a point in time when the interior of the anode electrode 22 and the anode outlet channel 41 is filled with hydrogen, and the control transited from the start-up control to the normal electric distribution control.

From FIG. 3, it becomes apparent that the rise of the cell voltage of the fuel cell stack 20 is suppressed and the deterioration of the electrolyte membrane 21 is suppressed, by the current supply from the fuel cell stack 20 to the electric load 31 in the time period of $t_1$ to $t_2$. Further, by making the supply flow rate of air to the cathode electrode 23 constant, the current supplied from the fuel cell stack 20 to the electric load 31 is constant at equal to or lower than a stability OK current threshold value.

Figure 2:
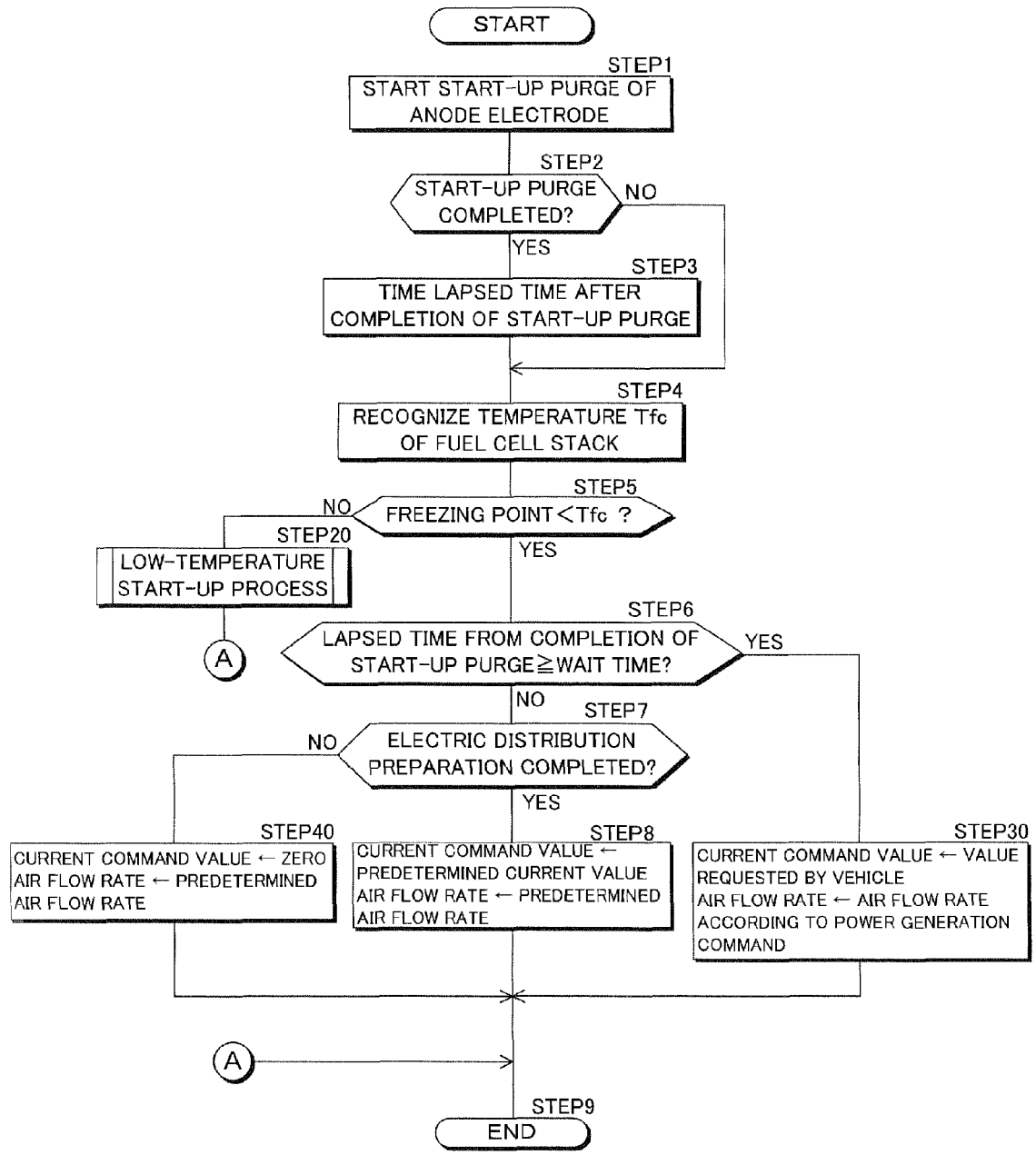
FIG. 2 is a flow chart indicating a start-up control and a normal electric distribution control of a fuel cell stack.

In the present embodiment, the control is transited from the start-up control to the normal electric distribution control when the predetermined time lapsed from the completion of the start-up purge in STEPS 3 through 6 in FIG. 2. However, it may be set so that the control transits from the start-up control to the normal electric distribution control at the time of completion of the start-up purge.

Further, the supply flow rate of air to the cathode electrode is made constant during execution of the start-up control, however, the effect of the present invention may be obtained even in the case where the supply flow rate is changed.

Further, in the present embodiment, it is determined whether or not the temperature Tfc of the fuel cell stack 20 is higher than freezing point in STEP 5, and the process of supplying current larger than that during idling from the fuel cell stack 20 to the electric load 31 is carried out in STEP 8 only when the temperature Tfc of the fuel cell stack 20 is higher than freezing point. However, the effect of the present invention may be obtained even in the case where the process of STEP 8 is carried out without carrying out the determination.

The invention claimed is:

1. A method for controlling gas flow rates in a fuel cell device, the fuel cell device comprising a fuel cell stack configured from a plurality of membrane electrode assemblies, each of which is formed by arranging an anode electrode and a cathode electrode having a gas channel with an electrolyte membrane sandwiched in-between, an outlet of the anode electrode and an ejector provided in an anode inlet channel are connected by an anode outlet channel, so that the hydrogen ejected from the anode electrode without being used is supplied again from the ejector to the anode electrode, the method comprising:

adjusting a supply flow rate of a fuel gas to the anode electrode;

adjusting a supply flow rate of an oxidant gas to the cathode electrode;

adjusting a supply current from the fuel cell stack to an electric load connected to the fuel cell stack;

performing a start-up control of the fuel cell stack, the start-up control comprising:

supplying a predetermined current value larger than a minimum current from the fuel cell stack to the electric load, during the period from start of supply of the fuel gas to the anode electrode until an interior of the anode electrode and the anode outlet channel are filled with the fuel gas, wherein the minimum current is the current necessary for power generation operation by the fuel cell stack in a normal electric distribution control during idling, stopping the supplying of a current larger than the minimum current from the fuel cell stack to the electric load, and switching to the normal electric distribution control, when a wait time lapses, wherein the wait time is predetermined assuming the time from the point in time the gas channel of the anode electrode is filled with the fuel gas to the point in time the anode outlet channel is filled with the fuel gas; and performing a normal electric distribution control, after completion of the start-up control, for controlling the supply flow rate of the fuel gas to the anode electrode and the supply flow rate of the oxidant gas to the cathode electrode, so that a required target current is supplied from the fuel cell stack to the electric load.

2. The method of claim 1 further comprising:

recognizing the temperature of the fuel cell stack, wherein, in the start-up control, the current larger than the minimum current is supplied from the fuel cell stack to the electric load only when the temperature of the fuel cell stack is higher than freezing point.

3. The method of claim 1, further comprising:

maintaining the flow rate of the oxidant gas supplied to the cathode electrode at a constant flow rate, during execution of the start-up control.

* * * * *